(12) United States Patent
Rastegar (10) Patent No.: US 9,194,497 B2
(45) Date of Patent: Nov. 24, 2015

(54) ELASTIC SEALS WITH DYNAMIC LIPS AND RELATED METHODS

(71) Applicant: Bal Seal Engineering, Inc., Foothill Ranch, CA (US)

(72) Inventor: Hamid Rastegar, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 0 days.

(21) Appl. No.: 14/475,356

(22) Filed: Sep. 2, 2014

(65) Prior Publication Data

US 2015/0061227 A1 Mar. 5, 2015

Related U.S. Application Data

(60) Provisional application No. 61/873,239, filed on Sep. 3, 2013.

(51) Int. Cl.
F16J 15/32 (2006.01)

(52) U.S. Cl.
CPC .......... *F16J 15/3208* (2013.01); *F16J 15/3212* (2013.01)

(58) Field of Classification Search
CPC ..... F16J 15/32; F16J 15/3204; F16J 15/3208; F16J 15/3236
See application file for complete search history.

(56) References Cited

U.S. PATENT DOCUMENTS

| | | | |
|---|---|---|---|
| 5,979,904 A | 11/1999 | Balsells | |
| 5,984,316 A | 11/1999 | Balsells | |
| 5,992,856 A | 11/1999 | Balsells et al. | |
| 6,050,572 A | 4/2000 | Balsells et al. | |
| 6,161,838 A * | 12/2000 | Balsells | 277/511 |
| 6,264,205 B1 | 7/2001 | Balsells | |
| 6,641,141 B2 | 11/2003 | Schroeder | |
| 7,210,398 B2 | 5/2007 | Balsells | |
| 2009/0146379 A1* | 6/2009 | Foster et al. | 277/307 |
| 2011/0037234 A1 | 2/2011 | Balsells et al. | |
| 2014/0265139 A1* | 9/2014 | Dilmaghanian et al. | 277/309 |

FOREIGN PATENT DOCUMENTS

| | | | |
|---|---|---|---|
| EP | 2233799 A1 | 9/2010 | |
| EP | 2273163 A2 | 1/2011 | |
| EP | 2559924 A2 | 2/2013 | |
| WO | WO 2009/142986 A2 | 11/2009 | |

OTHER PUBLICATIONS

Extended European Search Report from European Patent Office on co-pending EP application (EP14183353.3) dated Feb. 19, 2015.

* cited by examiner

*Primary Examiner* — Gilbert Lee
(74) *Attorney, Agent, or Firm* — Klein, O'Neill & Singh, LLP (57) ABSTRACT

Seal assemblies and methods that include a seal lip that comprises an extended portion with generally constant cross-sectional width for low and generally constant friction during wear are described. The seal lip is loaded against a dynamic member by the aid of a spring energizer. The extended portion of the seal lip maintains constant torque resistance during movement of the dynamic member.

24 Claims, 8 Drawing Sheets

ELASTIC SEALS WITH DYNAMIC LIPS AND RELATED METHODS

FIELD OF ART

Elastic seals discussed herein generally relate to seals for reciprocating or rotary applications and more particularly to seals having dynamic sealing lips and related methods, including spring energized seals.

BACKGROUND

Conventional spring energized seals for sealing against a dynamic member, such as a shaft, in rotary or reciprocating applications comprise a seal lip that may undergo gradual wear due to friction between the seal lip and the dynamic member. Among other things, a typical seal lip protrudes from a seal body and gradually extends towards the surface of the dynamic member, and thus due to this geometry, the sealing surface of the seal lip increases in area with increased lip wear. This is analogous to a typical sharpened pencil, which gradually dulls as the tip wears due to usage. The increased sealing surface area in situ can result in increased friction, which may cause the following undesirable results: increased wear, increased temperature, and/or increased resistance to rotation or reciprocation of the dynamic member. Continuance of increasing friction can be detrimental to the mechanical system and particularly to the seal ultimately leading to the possibility of failure.

SUMMARY

The disclosed invention relates to devices, assemblies and methods involving seals having sealing lips and to spring energized seals having sealing lips.

The disclosed seals and energized seals with dynamic lips are configured to minimize drastic friction variation as the seal lips wear by incorporating a seal lip geometry shaped in a way that as the seal lip wears, the seal lip sealing surface area increase is minimized compared to typical prior art seal lips. The unique seal lip geometry is configured to maintain a more constant seal lip wear rate, sealing surface temperature, and resistance load on or against the motion of the dynamic member.

The seal assemblies introduced herein comprise a sealing component comprising a seal lip with an extended portion, a rigid component comprising a groove, and a spring energizer within the groove biasing the seal lip towards a dynamic surface to be sealed thereagainst. The spring energizer and the extended portion of the seal lip with a generally constant cross-sectional width provide relatively constant torque resistance while sealing against a dynamic member. The width of the seal lip can be about 3% to about 20% of the width of the major axes of the coils of the spring energizer. In some examples, the width of the seal lip is about 3% to about 8% of the width of the major axes with the overall seal lip width variation, of the sections that are expected to wear during use, being up to about 25% of the maximum width. In other words, if the maximum width is 1 mm, the width variation can extend to about 0.75 mm. To be more consistent or constant, the variation should be kept to within about 15% of the maximum width. This feature allows the seal assembly to maintain a more constant seal lip wear rate, sealing surface temperature, and resistance load on or against the motion of the dynamic member.

Other seal assemblies introduced herein comprise a sealing component comprising a seal lip with an extended portion, a groove, and a spring energizer within the groove biasing the seal lip towards a dynamic surface to be sealed thereagainst. The spring energizer and the extended portion of the seal lip with a generally constant cross-sectional width provide relatively constant torque resistance while sealing against a dynamic member. In some examples, the width of the seal lip is about 3% to about 8% of the width of the major axes with the overall seal lip width variation, of the sections that are expected to wear during use, being about 25% of the maximum width. To be more consistent or constant, the variation should be kept to within about 15% of the maximum width. This feature allows the seal assembly to maintain a more constant seal lip wear rate, sealing surface temperature, and resistance load on or against the motion of the dynamic member.

An aspect of the present disclosure is understood to cover a seal assembly comprising: a sealing component and a spring energizer comprising a plurality of coils, the sealing component and the spring energizer each comprising a bore that align; the sealing component comprising an inside flange with a seal lip and a groove having a V-bottom in which the spring energizer is located; the seal lip comprising an extended portion that extends in a direction of the bore; the extended portion for sealing against a dynamic member has a generally constant cross-sectional width to within 20% of a maximum width that wears during use to produce a generally constant surface friction when worn; and wherein the plurality of coils contact two tapered surfaces of the V-bottom.

The seal assembly wherein the seal lip can have two sidewalls that are generally parallel.

The seal assembly can further comprise a rigid component connected to the sealing component.

The seal assembly wherein the rigid component can have the V-bottom formed therewith for retaining the spring energizer.

The seal assembly wherein the sealing component and the rigid component can engage by snap fit.

The seal assembly wherein the sealing component and the rigid component can engage by latching.

The seal wherein the sealing component and the rigid component can be butting one another.

The seal assembly wherein the sealing component can comprise a second seal lip formed on a second inside flange and wherein the inside flange and the second inside flange can have end edges that point away from one another.

The seal assembly wherein a second spring energizer can be included to bias the second seal lip and wherein the second seal can have a constant cross-sectional width to within 20% of a maximum width that wears during use to produce a generally constant surface friction when worn.

The seal assembly wherein the second spring energizer can be located in a second groove cavity comprising a v-bottom.

Another aspect of the present disclosure is a seal assembly comprising: a sealing component comprising a bore, an outside flange, a center channel section comprising a base, and an inside flange; a rigid component comprising a bore, a body comprising a body flange and an attachment flange; the sealing component and the rigid component latched to one another by engaging projections on the outside flange of the sealing component and the attachment flange of the rigid component together; the inside flange of the sealing component comprising an extended portion forming a seal lip for sealing against a dynamic member; the seal lip comprising two sidewalls and a bottom wall; the inside flange tapers without aid of a spring energizer from the base of the center channel section towards a common bore defined by the bore of the sealing component and the bore of the rigid component so that the bottom wall of the seal lip is closer to an axis defined by the common bore than when the inside flange extends from the base without any taper; and wherein the extended portion has a generally constant cross-sectional width to about 23% of a maximum width that wears during use to produce a generally constant surface friction when worn.

The seal assembly wherein a surface of the attachment flange on a side opposite the projections can be flat or generally planar to not retain or catch any spring energizer.

The seal assembly wherein a surface of the attachment flange on the rigid component and a surface on the inside flange of the sealing component opposite the seal lip can both be generally planar to not retain or catch any spring energizer.

The seal assembly wherein the body of the rigid component can have a relief formed between the body flange and the attachment flange; which is tapered or slanted relative to the common bore and on the side of the rigid component closer to the common bore.

The seal assembly wherein a gap is defined between the attachment flange and the inside flange and wherein the gap can be larger at the opening to the gap and tapers inwardly away from the opening, near the base of the sealing component.

A further aspect of the present disclosure is understood to include a method for manufacturing a seal assembly. The method can comprise: placing a spring energizer comprising a plurality of coils into abutting contact with the sealing component so that a bore of the spring energizer and a bore of the sealing component align; the sealing component comprising an inside flange with a seal lip and a groove having a V-bottom in which the spring energizer is located; the seal lip comprising an extended portion that extends in a direction of the bore; the extended portion for sealing against a dynamic member has a generally constant cross-sectional width to within 20% of a maximum width that wears during use to produce a generally constant surface friction when worn; and wherein the plurality of coils contact two tapered surfaces of the V-bottom.

The method wherein the seal lip can have two sidewalls that are generally parallel.

The method can further comprise attaching a rigid component to the sealing component.

The method wherein the rigid component can have the V-bottom formed therewith for retaining the spring energizer.

The method wherein the sealing component and the rigid component can engage by snap fit.

The method wherein the rigid component can have a leaf spring and wherein the leaf spring can bias against an interior surface of a housing.

The method wherein the sealing component and the rigid component can be in a butting contact.

A still yet further aspect of the present disclosure is a method for using a seal assembly. The use method can comprise: placing a sealing component and a spring energizer comprising a plurality of coils into a bore of a housing; the sealing component and the spring energizer each comprising a bore that align for receiving a shaft; the sealing component comprising an inside flange with a seal lip and a groove having a V-bottom in which the spring energizer is located; the seal lip comprising an extended portion that extends in a direction of the bore; the extended portion for sealing against a dynamic member has a generally constant cross-sectional width to within 20% of a maximum width that wears during use to produce a generally constant surface friction when worn; and wherein the plurality of coils contact two tapered surfaces of the V-bottom.

The use method wherein a rigid component can attach to the sealing component.

The use method wherein the rigid component can have the V-bottom formed therewith for retaining the spring energizer.

The use method wherein the sealing component and the rigid component can engage by snap fit.

The use method wherein the rigid component can have a leaf spring and wherein the leaf spring can bias against an interior surface of the housing.

The use method wherein the sealing component and the rigid component can be in a butting contact.

Yet another aspect of the present disclosure is directed to a seal assembly comprising: a sealing component, a rigid component, and a spring energizer together comprising a bore; the sealing component comprising an inside flange have a seal lip; wherein the rigid component is engaged with the sealing component and the rigid component comprises a groove that forms a spring cavity with the inside flange in which the spring energizer is located; the seal lip comprising an extended portion that extends in a direction of the bore; and the extended portion for sealing against a dynamic member being generally constant in cross-sectional width to within 20% to produce a generally constant surface friction when worn.

A still yet further aspect of the present disclosure is directed to a seal assembly comprising: a sealing component, and a spring energizer together comprising a bore; the sealing component comprising an inside flange have a seal lip and a groove defined by the inside flange, an outside flange, and a center channel section that forms a spring cavity in which the spring energizer is located; the seal lip comprising an extended portion that extends in a direction of the bore; and the extended portion for sealing against a dynamic member being generally constant in cross-sectional width to within 20% to produce a generally constant surface friction when worn.

DESCRIPTION OF DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of elastic seals provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
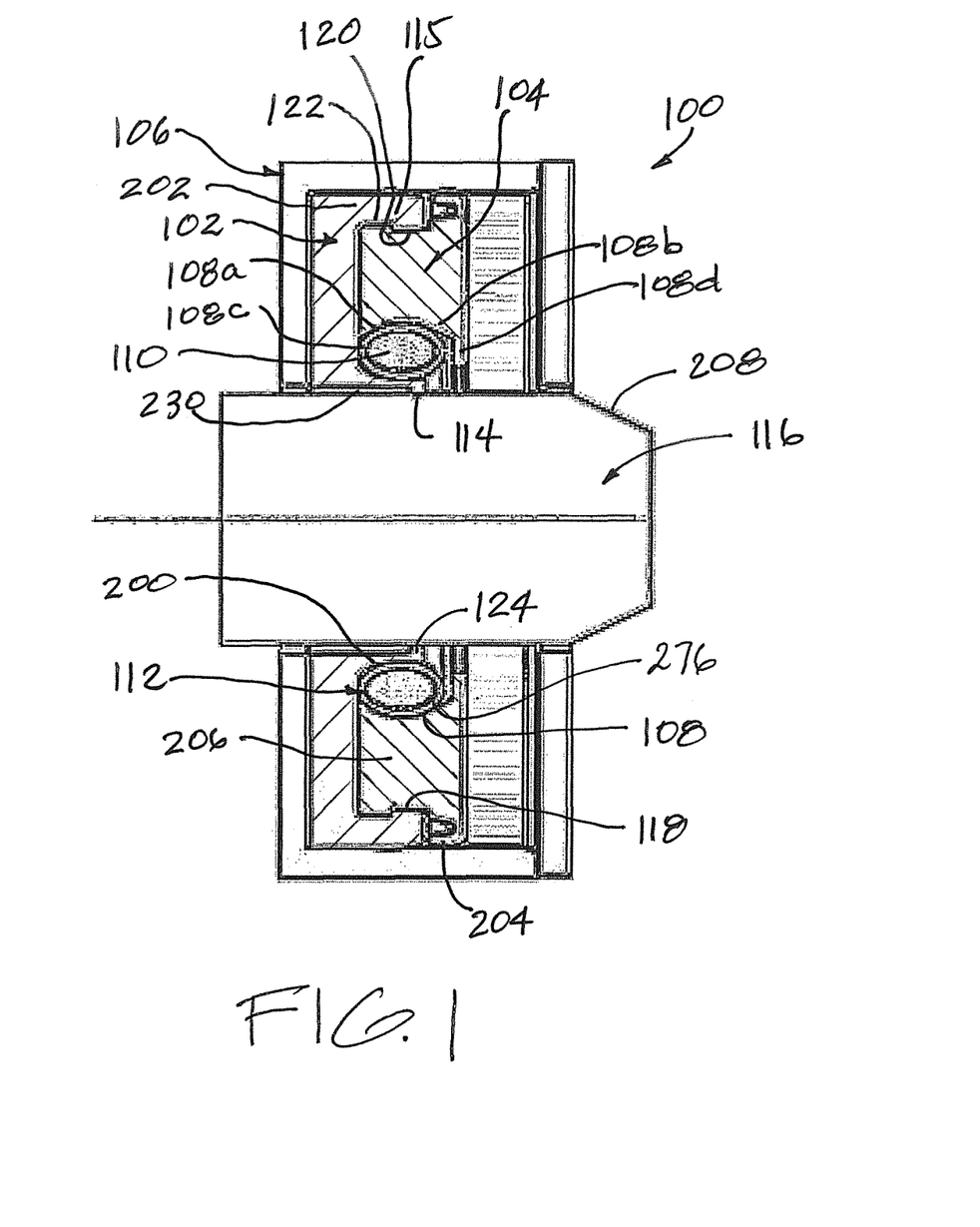
FIG. 1 shows a cross-sectional side view of an embodiment of an energized seal with dynamic lip, energized by a canted coil spring.

FIG. (also "FIG." or "Fig.") 1 shows an embodiment of a seal assembly 100 provided in accordance with aspects of the present devices, systems, and methods. In the exemplary embodiment shown, the seal assembly 100 comprises a sealing component 102 that is snap fitted with a rigid component 104 whereby the sealing component and the rigid component are located in a housing 106, which can be a gland or a stuffing box of an equipment or a housing of a cartridge seal that is then sized and shaped along with the seal assembly for mounting in a gland or a stuffing box of an equipment. The rigid component 104 comprises a groove 108 that is v-bottom where, along with the sealing component 102, forms a spring cavity 110. In other words, the spring cavity 110 is defined at least in part by both the rigid component 104 and the sealing component. The rigid component 104 may be referred to as a locking ring and has a leaf spring, as further discussed below, for securing the seal assembly into a bore of a housing, such as in a gland or in a cartridge housing. Together, the various components of the seal assembly have a bore for receiving a dynamic member or component, such as a shaft or a rod.

The spring cavity 110 is sized and shaped to accommodate a spring energizer 112. The groove 108 has two tapered surfaces 108a, 108b forming a V-shaped or V-bottom groove. In another example, a flat bottom surface is located between the two tapered surfaces 108a, 108b. In still other examples, the groove 108 is generally V-shaped but the surfaces of the groove are formed from multiple distinct planar surface sections that together form the generally V-shaped groove. In still yet other examples, the groove 108 has a single flat bottom surface located between two sidewalls, which is generally U-shaped. In the alternative U-shaped groove, the spring energizer 112 contacts the two sidewalls to maintain an axial position of the coils relative to a lengthwise axis of the dynamic component 116. As shown, the groove 108 has two sidewalls 108c, 108d, one formed by the seal body 206 and the other by the rigid component 104. The spring energizer 112 may contact one sidewall, both sidewalls, or none of the sidewalls as the V-shaped groove 108 can axially locate the spring energizer relative to the longitudinal axis of the dynamic member 116.

The spring energizer 112, such as a canted coil spring, is positioned within the spring cavity 110 and exerts a load, such as a biasing force, onto the sealing component 102, or more specifically the inside flange 200 and the seal lip 114 of the sealing component 102, to seal against the dynamic component 116, which can be a rod or shaft comprising a tapered insertion end 208. As shown, the spring energizer 112 is a radial canted coil spring but can be an axial canted coil spring. The spring comprises a plurality of interconnected coils each with an elliptical shape having a major axis and a minor axis, which is the shorter of two axes. The spring energizer 112 contacts both the inside flange 200 of the sealing member 102 and the rigid component 104 and biases against both the inside flange and the groove 108 of the rigid component. In other examples, the coils can have shapes other than elliptical, such as rectangular shape or oval shape. A gap 230 is provided between the dynamic component 116 and the inside exterior surface of the inside flange 200.

The V-bottom groove 108 of the rigid component 104 ensures proper positioning of the spring energizer 112 within the spring cavity 110 and proper load location on the inside flange 200 and hence the seal lip 114. For example, the V-bottom 108 ensures generally optimal position and orientation of the spring energizer within the spring cavity. The V-bottom has two tapered surfaces 108a, 108b that contact the spring 112 to ensure proper positioning of the spring along an axial position relative to the lengthwise axis of the dynamic member 116 or of the bore of the seal assembly so that the minor axes of the individual coils of the spring energizer are at or proximately positioned at the seal lip 114. Because the coils of the canted coil spring deflect the most along their minor axes, positioning the minor axes of the coils directly over or nearly directly over the seal lip 114 provides for an optimum working range and force deflection. As further discussed below, this allows the seal lip 114 to be structured with a generally constant width so that when it wears, the sealing surface provided between the seal lip and the dynamic component remains generally constant. Coupled with the seal lip 114 of the present disclosure, the position of the coil and the unique seal lip geometry are configured to maintain a more constant seal lip wear rate, sealing surface temperature, and resistance load on or against the motion of the dynamic member.

An additional groove 120 on the outer surface of the rigid component 104 enables a snap fit of an upper protrusion 118 located on the outside flange 202 of the sealing component 102 and a lower protrusion 122 of the rigid component 104 at a snap-fit joint 115. In other examples, the sealing component and the rigid component are attached by latching. Latching can be considered a broader term for any mechanical engagement that excludes butting or abutting. For example, a slight interference, a small detent, etc., can be considered latching. In another example, the two components simply abut or in a butting configuration without snap-fit or latching, such as that shown in FIG. 3.

As shown, the seal lip 114 comprises an extended portion 124 that extends in a direction generally perpendicular to and towards the surface of the dynamic member 116, or towards the bore of the seal assembly if not mounted on a dynamic member, whereby the extended portion seals against the dynamic member 116 and maintains a generally constant cross-sectional width as it wears. In one embodiment, the extended portion 124 is generally square or rectangular along a cross-section with two generally parallel sidewalls. Therefore, the contact area between the extended portion and the dynamic member does not change significantly with wear due to generally constant width. This minimizes the resistance to the movement of the dynamic member during the life of the seal assembly as the seal lip 114 wears. Thus, the present seal lip 114 is configured to maintain a more constant seal lip wear rate, sealing surface temperature, and resistance load on or against the motion of the dynamic member.

A leaf spring 204 is provided with the rigid component 104. The leaf spring 204 comprises a finger and is attached at one end to the body 206 and is located next to a void 224. The leaf spring 204 is configured to deflect inwardly towards the axis of the rod 116 due to the constraint of the housing 106, which produces an outwardly biasing force to retain the seal assembly inside the housing. As shown, the finger points in the direction of the sealing component 102. In other examples, the finger points away from the sealing component.

In one example, the sealing member 102 is made from an elastic material, such as from a rubber material, an elastomer material, a polymer, a thermoplastic elastomer (TPE), copolymer, teropolymer, or a tetrapolymer. Specific examples include Polytetrafluoroethylene (PTFE), rubber, ethylene propylene diene monomer (EPDM), silicone rubber, polyacrylate elastomer, VITON, etc. The rigid component may be made from a hard plastic, an engineered plastic, or from a metal material. Engineered plastic can include polyetheretherketone (PEEK), polyetherketone (PEK), polyamides (PA), or polysulphone (PSU). Metal material can include aluminum, soft metal such as brass, bronze, or copper, stainless steel, steel, and metal alloys, such as low carbon steel and high tensile steel. Depending on the application, such as being in a corrosive or for sealing low molecular weight gases, the elastic material and the material for the rigid component can obviously change.

Thus, an aspect of the present disclosure is understood to include a seal assembly comprising a sealing component comprising an inside flange having a seal lip, a rigid component, and a spring energizer; and wherein the rigid component is engaged with the sealing component and comprises a groove that along with the inside flange of the sealing component forms a spring cavity in which the spring energizer is located. In an example, the groove in the rigid component comprises a V-groove. In another example, the seal lip comprises an extended portion that extends in a direction generally perpendicular to and towards a surface of a dynamic member, such as a rod or a shaft. In other examples, the groove has a flat bottom surface located between two sidewalls.

As shown, the spring cavity 110 positions the spring energizer 112 such as the minor axes of the coils are primarily located over, such as being essentially directly over the seal lip 114. In some examples, the minor axes of a plurality of coils 276 are located directly over at least a portion of the seal lip 114. In other examples, the minor axes of a plurality of coils are located just outside the seal lip but no more than about one thousandths to about 0.1875 inch outside the seal lip. For example, as shown, the minor axes of the coils are slightly left of the left edge of the seal lip 114 of FIG. 1, assuming the minor axes of the coils are perpendicular to the axis of the rod 116. If the minor axes of the coils are in line with any part of the seal lip, such as on or within the a boundary defined by the width of the seal lip, than the minor axes are said to be located directly over at least a portion of the seal lip. The coils can also be slightly rotated so that the minor axes of the coils are not true perpendicular to the axis of the rod 116 but are either located directly over at least a portion of the seal lip or outside but no more than about one thousandths to about 0.1875 inch outside the seal lip. For large seal assemblies for use with large diameter dynamic members, the minor axes of the plurality of coils of the spring energizers can be located just outside the seal lip by a larger amount, such as by about 0.25 inch outside the seal lip.

In one example, the position of the minor axes of the plurality of coils can be controlled by appropriately sizing the major axes and the minor axes of the elliptical shaped coils. In an example, the major axes of the coils are about 5 to about 10 times, measured from outside to outside dimensions of the coils, the width of the seal lip 114. In the example shown, the major axis is about 7.7 times the width of the seal lip 114. This range allows the spring cavity 110 to be sized so that the length of the inside flange 200 is about 45% to about 70% of the major axes of the coils.

The spring cavity 110 with the spring groove 108 is configured to confine and orientate the minor axes of the coils of the canted coil spring 112 so that the minor axes are either located directly over at least a portion of the seal lip 114 or outside of the seal lip but by no more than about one thousandths to about 0.1875 inch outside the seal lip. The spring groove 108 can be V-shaped, V-shaped with a flat bottom in between two tapered surfaces, or arcuate with a plurality of distinct interconnected planar wall sections. This allows the biasing force of the plurality of coils to act on the seal lip 114 so that a generally constant width seal lip can be used with the sealing member. In other words, the extended portion 124 from an inside flange 200 of the sealing component 102 defining a seal lip 114 can have a generally constant cross-sectional width. This in turn provides for a generally constant friction between the seal lip and the dynamic surface of the dynamic member or component during normal wear of the sealing member. More specifically, as the seal lip wears, the new layers that emerge have generally the same width as the worn layers so that the surface area contact between the seal lip and the dynamic surface of the rod or shaft remains generally or roughly constant to within a small range of tolerance, such as within 20%, for example about 5% to 15%, of the maximum width that wears. Thus, the present seal lip 114 is configured to maintain a more constant seal lip wear rate, sealing surface temperature, and resistance load on or against the motion of the dynamic member.

Figure 7:
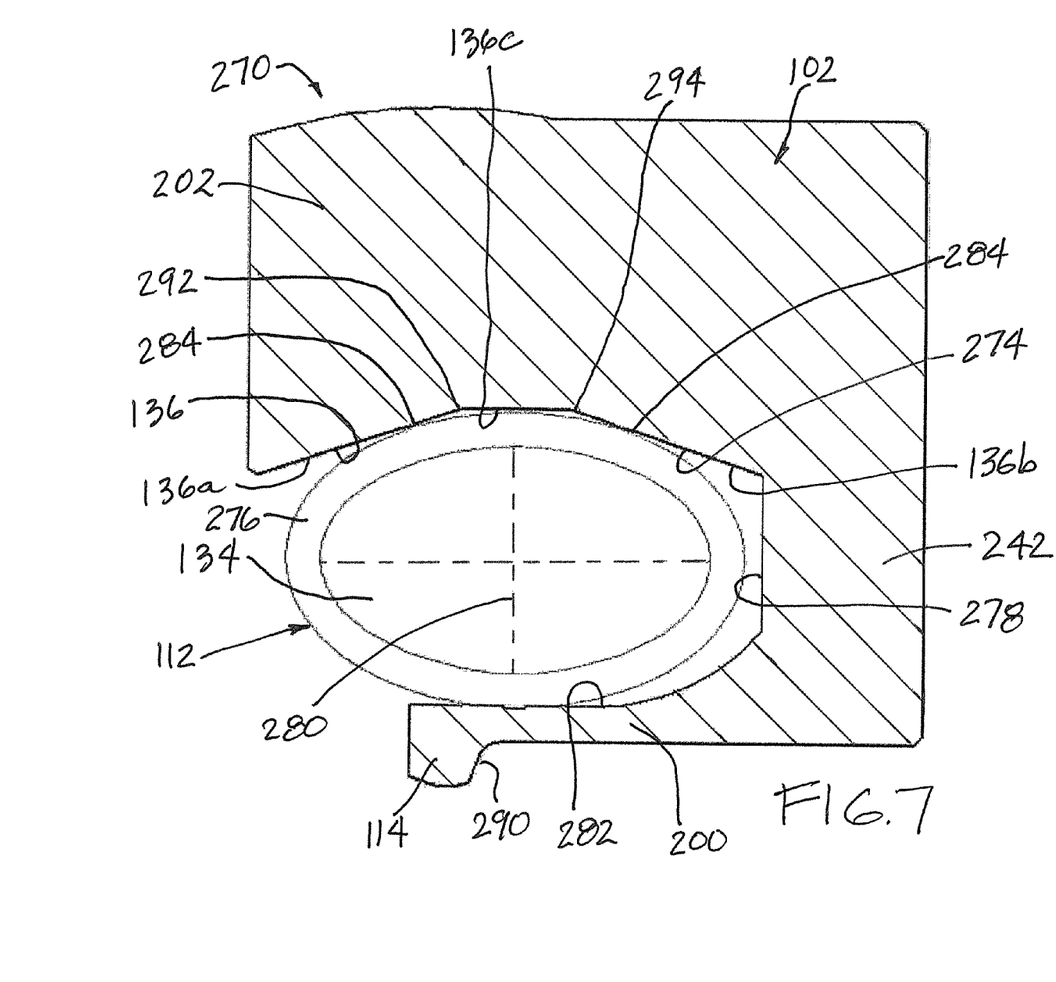
FIG. 7 shows an alternative seal assembly comprising a seal member having a seal lip with a groove having a spring energizer without a rigid member.

In some examples, the seal assembly has a groove cavity formed entirely from the sealing component 102, such as that shown with reference to FIG. 7. Thus, when a seal assembly is described with a groove cavity comprising a groove having a V-bottom in which a spring energizer is located, the V-bottom can be formed entirely from the sealing component 102 or from a combination of a rigid component 104 and a sealing component 102. In still yet other examples, the seal assembly has a groove cavity formed by a combination of a rigid body and an inside flange of the sealing component and a second groove cavity formed entirely from the sealing component, as shown with reference to FIGS. 1-4. In the dual sealing lip embodiments of FIGS. 1-4, as further discussed below, the seal component 102 is unitarily formed with two inside flanges, which is understood to be different from placing two separately formed seal components back to back or in contact with one another. The separately formed seal components of the prior art would require separate rigid components and therefore may not properly install into a single chamber without undue work.

A method for making a seal assembly and a method for using the seal assembly as described herein are contemplated.

For other seal assemblies and seal assembly components disclosed herein below, such as for other sealing elements and rigid components, it is understood that where a feature is shown but not expressly described and is otherwise the same or similar to the feature or features described elsewhere, such as above with reference to FIG. 1, the disclosed part or parts shown in the subsequent drawing figures but not expressly described because of redundancy and because knowledge is built on a foundation laid by earlier disclosures may nonetheless be understood to be described or taught by the same or similar features expressly set forth in the text for the embodiments in which the feature or features are described, such as for the seal assembly of FIG. 1. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 2:
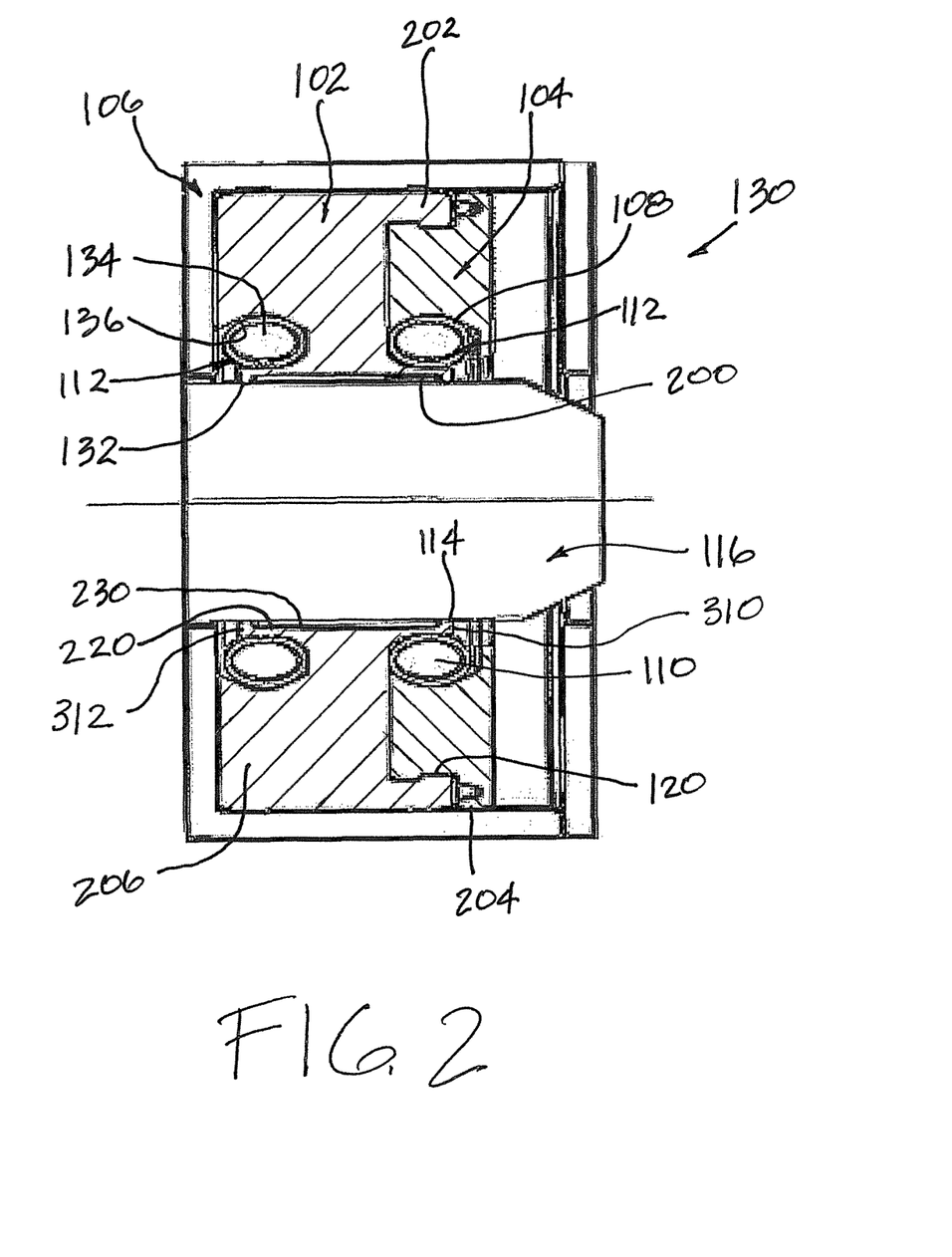
FIG. 2 shows a cross-sectional side view of an embodiment of an energized seal with two dynamic lips, both energized by canted coil springs.

FIG. 2 shows an alternate seal assembly embodiment 130 provided in accordance with further aspects of the present devices, systems, and methods. The alternative seal assembly 130 resembles the seal assembly 100 illustrated in FIG. 1 with the following exceptions. The seal assembly 130 has a sealing component 102 comprising a second inside flange 220 comprising a second seal lip 132, a second V-bottom groove or V-shaped groove 134, and a second spring energizer 112 to bias the second seal lip 132 of the seal assembly 130. The second V-bottom groove 134 is incorporated to ensure proper spring positioning of the second spring energizer 112 in the second spring cavity 136. The present multiple seal lips seal assembly may be suitable for applications requiring a larger dynamic member, better sealing stability, increased effectiveness in fluid flow control, and/or multi-directional sealing. A gap 230 is provided between the dynamic member 116 and the inside exterior surface of the two flanges, in between the two seal lips 114, 132. As shown, the two inside flanges 200, 220 have end edges 310, 312, respectively, that point away from one another.

In an example, the second spring cavity 134 is wholly formed or defined by the seal body 206 of the sealing component 102 whereas the first spring cavity 110 is formed by a combination of the rigid component 104, such as the groove 108, and the first inside flange 200 of the sealing member or component 102. For example, the second groove cavity 134 is formed by a V-bottom groove or a V-surface 136 formed within the seal body 206 and the second inside flange 220. The combination defines the second groove cavity 134 for accommodating the second spring energizer 112. The two inside flanges 200, 220 have tips that point away from one another and wherein the two spring cavities 110, 134 have shaped surfaces to axially position the two spring energizers 112 so that the minor axes of the coils of the two spring energizers are either located directly over at least a portion of the respective seal lips 114, 132 or outside but no more than about one thousandths to about 0.1875 inch outside the respective seal lips 114, 132. In one example, the two seal lips 114, 132 are similarly shaped. In another example, the two seal lips 114, 132 are shaped differently. For example, the first seal lip 114 can be generally rectangular or square in cross section whereas the second seal lip 132 can embody one of the seal lips shown in FIGS. 5A-5E.

In an example, the two spring energizers 112 of the seal assembly 130 of FIG. 2 are the same size and are both radial canted coil springs. In another example, the two spring energizers 112 have different lengths for their major and minor axes. For embodiments with different spring energizers, the lengths of the two inside flanges 200, 220 can be the same or can differ. In still other examples, the spring cavity 110 with the rigid component 104 has an axial canted coil spring located therein while the cavity formed entirely from the seal body has a radial canted coil spring located therein.

Figure 3:
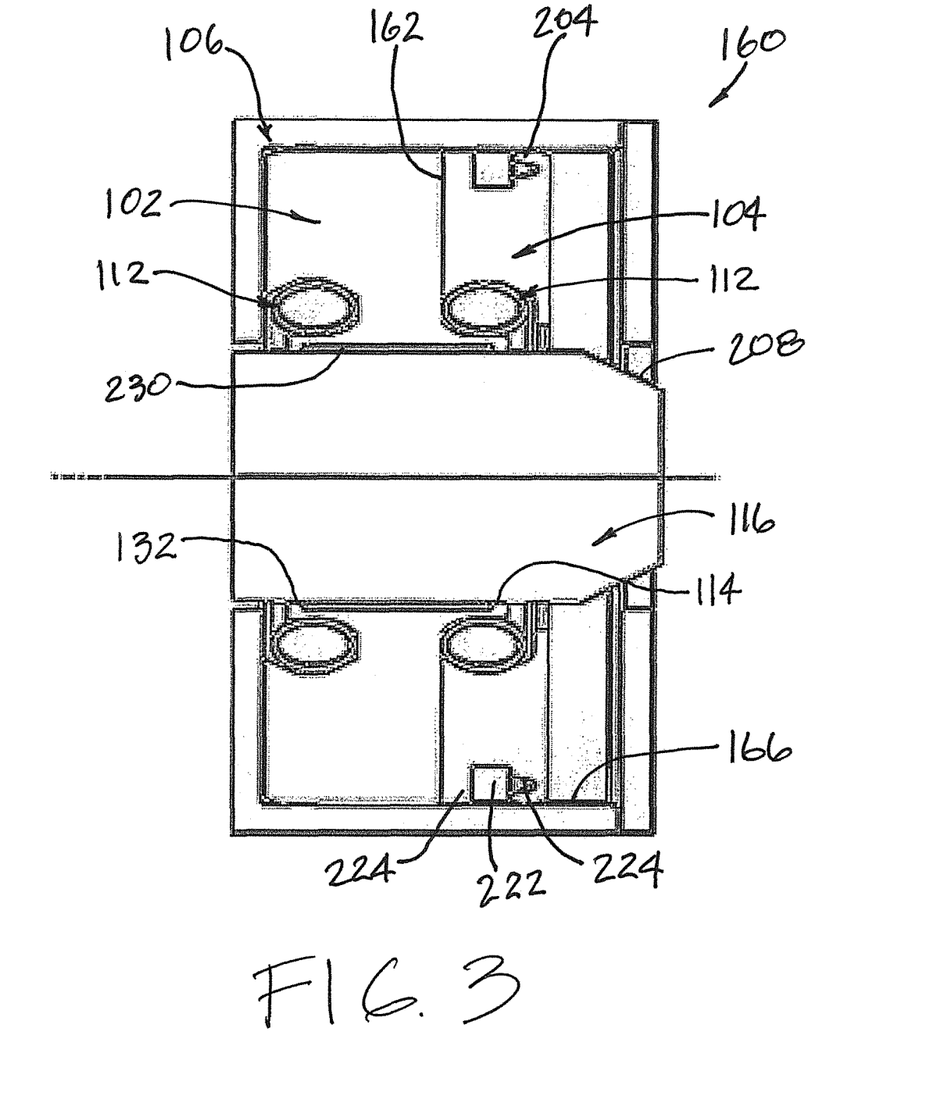
FIG. 3 shows a cross-sectional side view of an embodiment of an energized seal comprising a sealing component and a rigid component engaged by butting.

FIG. 3 shows an alternate seal assembly 160 in accordance with further aspects of the present disclosure where the snap fit or latching between the sealing component 102 and the rigid component 104 is replaced by a different assembly feature 162. As shown, the assembly feature 162 does not involve a snap fit or mechanical engagement between the sealing component and the rigid component. As shown, the rigid component 104 is in a butting or abutting relationship with the sealing component 102. In one example, the rigid component incorporates a leaf spring 204 for biasing against the interior surface 166 of the housing 106. As the mechanical engagement (See, e.g., FIGS. 1 and 2) has been omitted in favor of the assembly feature 162 shown in FIG. 3, an external channel 222 is provided adjacent a void 224 on the leaf spring 204. The external channel 222 is located next to a flange 224, which abuts against the sealing component 102. The flange 224 can have a square corner or can be radiused or rounded.

Figure 4:
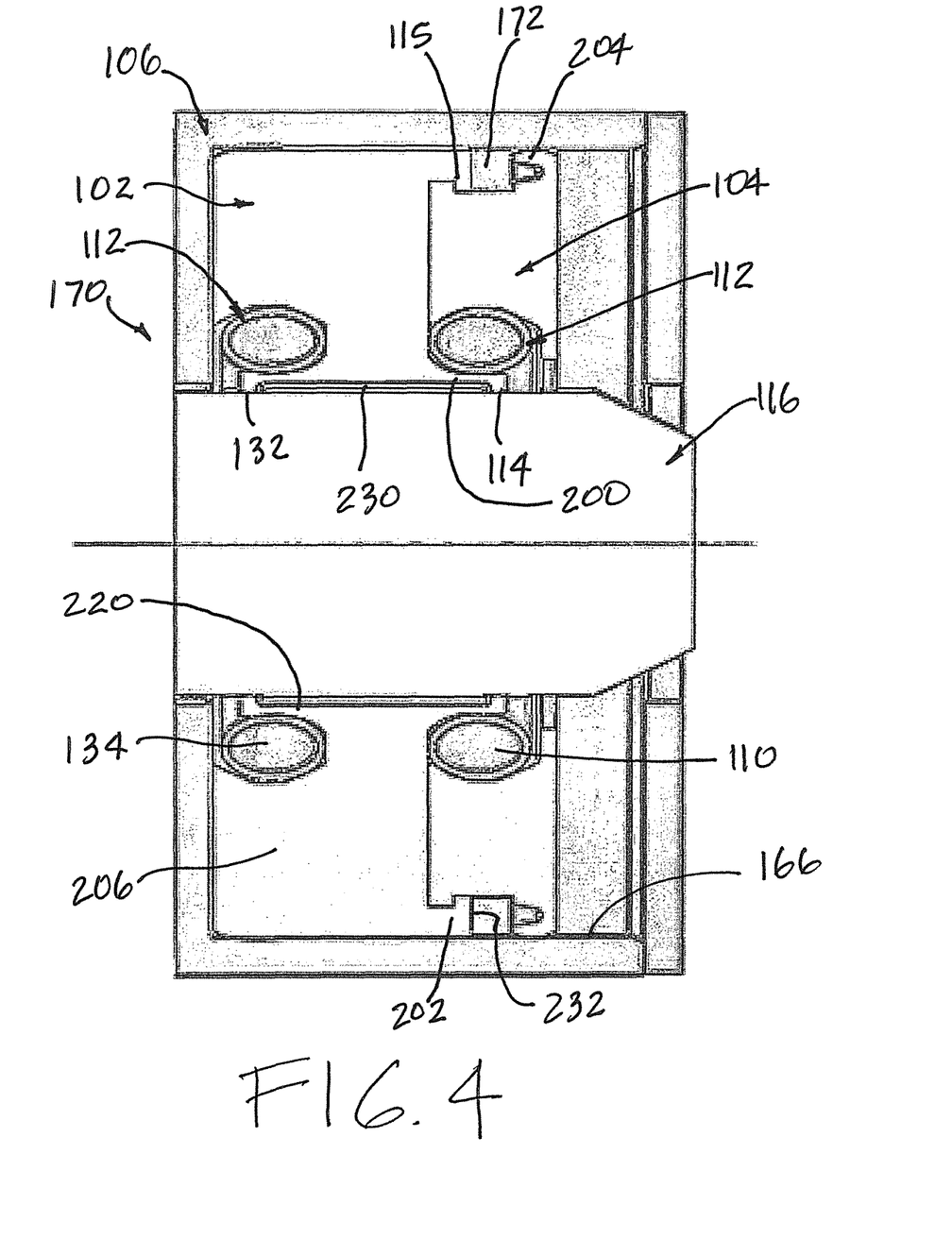
FIG. 4 shows a cross-sectional side view of an embodiment of an energized seal comprising a sealing component and a rigid component engaged by latching.

FIG. 4 shows yet another alternate seal assembly 170 in accordance with the present devices, systems, and methods where the sealing component 102 and the rigid component 104 are engaged by latching, similar to the latching of FIGS. 1 and 2. As shown, a gap or channel 172 is provided between the latching feature and the snap-fit joint 115. The present seal assembly 170 is similar to the double seal lips version of FIG. 2 but wherein the gap 172 is provided due to the use of larger sized spring energizers 112. As further discussed below, the width of the rigid component 104 increased due to the use of a larger spring energizer 112 in the first spring cavity 110. However, since the snap-joint 115 can remain relatively the same as for a smeller spring energizer, the gap 172 is created as a by-product. In other examples, the end 232 of the outside flange 202 can lengthen to eliminate or reduce the width of the gap 172.

The spring energizers 112 of the present embodiment have larger major and minor axes than the spring energizers of FIG. 2. Thus, the spring cavities 110, 134 are also relatively larger to accommodate the larger spring energizers of the present embodiment. The spring cavities are larger by increasing the widths of the rigid component 104 and the width of the seal body 206. This also lengthens the inside flanges 200, 220 that partially define the two spring cavities. However, the minor axes of the spring coils of the two spring energizers are primarily located over, such as being essentially directly over the seal lips 114, 134 as discussed elsewhere herein. In some examples, the minor axes of the plurality of coils are located directly over at least a portion of the respective seal lips. In other examples, the minor axes of the plurality of coils are located just outside the respective seal lips, as shown, and the amount that they are outside the respective seal lips can vary depending on the relative size of the spring energizers and the length of the inside flanges. In the example shown, the minor axes of the plurality of coils are located just outside the respective seal lips by about one thousandths to about 0.25 inch outside the respective seal lips.

Figure 5:
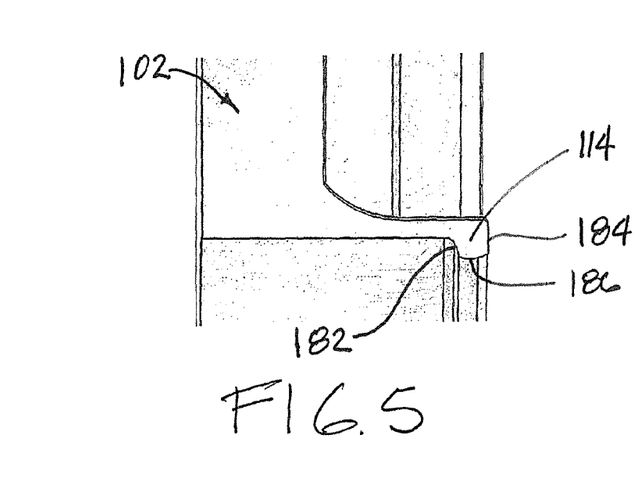
FIG. 5-5E show different embodiments of extended seal lip portions having a generally constant cross-sectional width.
Figure 5A:
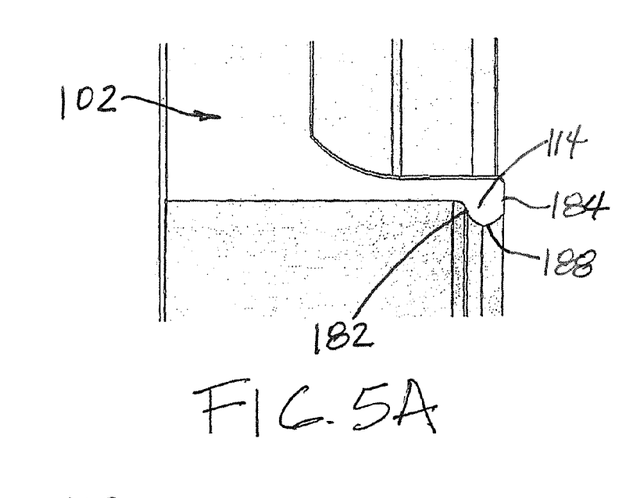
Figure 5B:
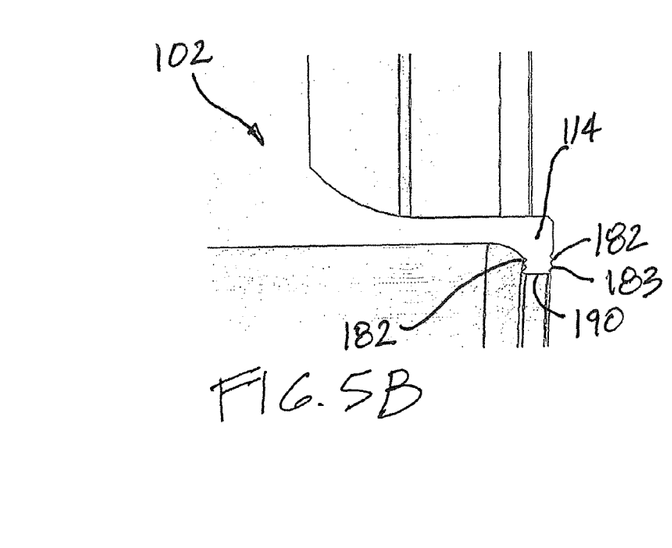
Figure 5C:
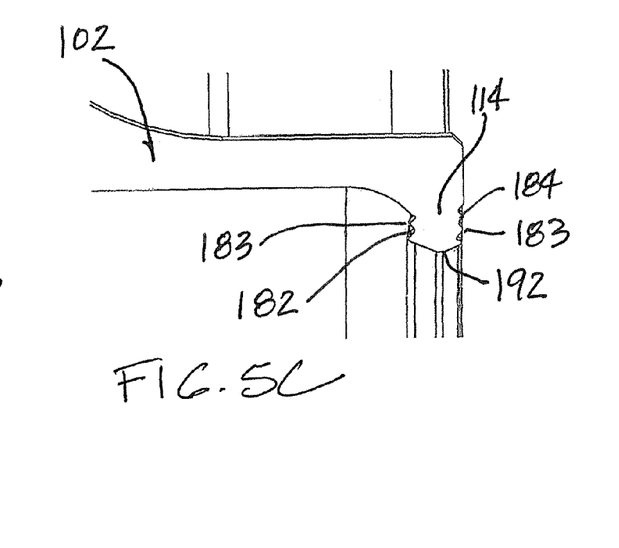
Figure 5D:
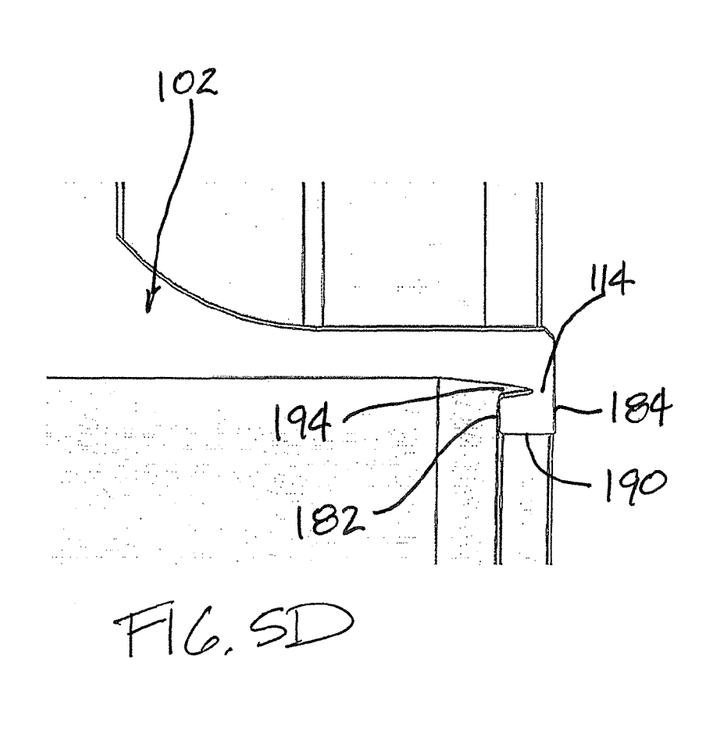
Figure 5E:
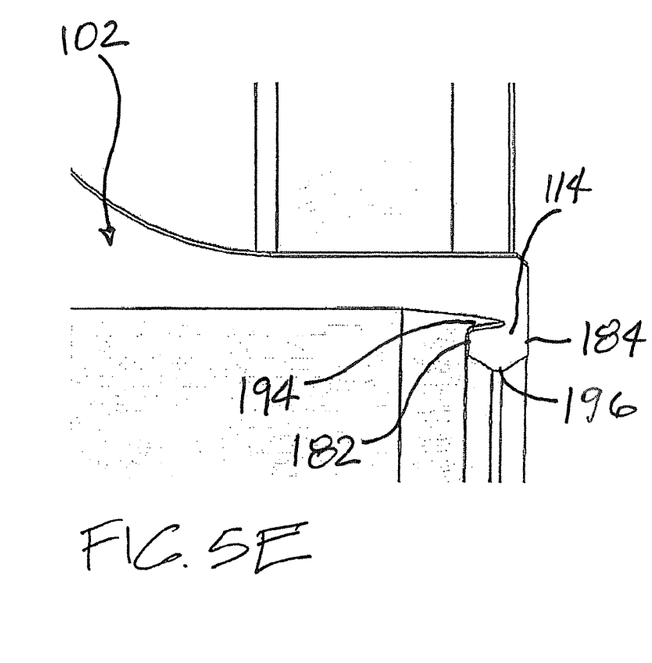

FIGS. 5-5E show various embodiments of extended seal lip portions, in partial cross-sections. That is, FIGS. 5-5E are partial cross-sectional views of exemplary seal components 102 having different seal lip shapes or configurations extending from an inside flange. The seal lip embodiments shown have a generally constant cross-sectional width that is generally perpendicular to and extends towards the surface of the dynamic member, or the bore of the seal assembly if not mounted onto a dynamic member. The seal lips of FIGS. 1-4 can embody any of the seal lips discussed elsewhere herein with reference to FIGS. 5-5E. FIG. 5 shows a seal lip 114 comprising two generally parallel sidewalls 182, 184 and a curved bottom wall 186, which may be symmetrical around a line located mid-way and parallel to the two side walls 182, 184. In another example, the curved bottom wall 186 may be non-symmetrical, i.e., asymmetrical. In some examples, the two sidewalls 182, 184 can be slightly converging or slightly diverging. As the seal lip wears, the friction between the seal lip and the dynamic member remains generally constant due to the generally constant cross-sectional width of the seal lip. Thus, the present seal lip 114 is configured to maintain a more constant seal lip wear rate, sealing surface temperature, and resistance load on or against the motion of the dynamic member.

FIG. 5A shows a seal lip 114 comprising two generally parallel sidewalls 182, 184 and a curved bottom wall 188 having greater slopes than the bottom wall of FIG. 5.

FIG. 5B shows a seal lip 114 comprising two sidewalls 182, 184 with jagged edges 183 and a flat or straight bottom wall 190. In other examples, only one of the sidewall has a jagged edge.

FIG. 5C shows a seal lip 114 comprising two sidewalls 182, 184 with jagged edges 183 and a curved bottom wall 192. In other examples, only one of the sidewall has a jagged edge.

FIG. 5D shows a seal lip 114 comprising two generally parallel sidewalls 182, 184 and a flat bottom wall 190. A recess or cut-out 194 is provided on or at one of the sidewalls to form a cantilevered section.

FIG. 5E shows a seal lip 114 comprising two generally parallel sidewalls 182, 184 and a curved bottom wall 196. A recess or cut-out 194 is provided on or at one of the sidewalls to form a cantilevered section.

Figure 6:
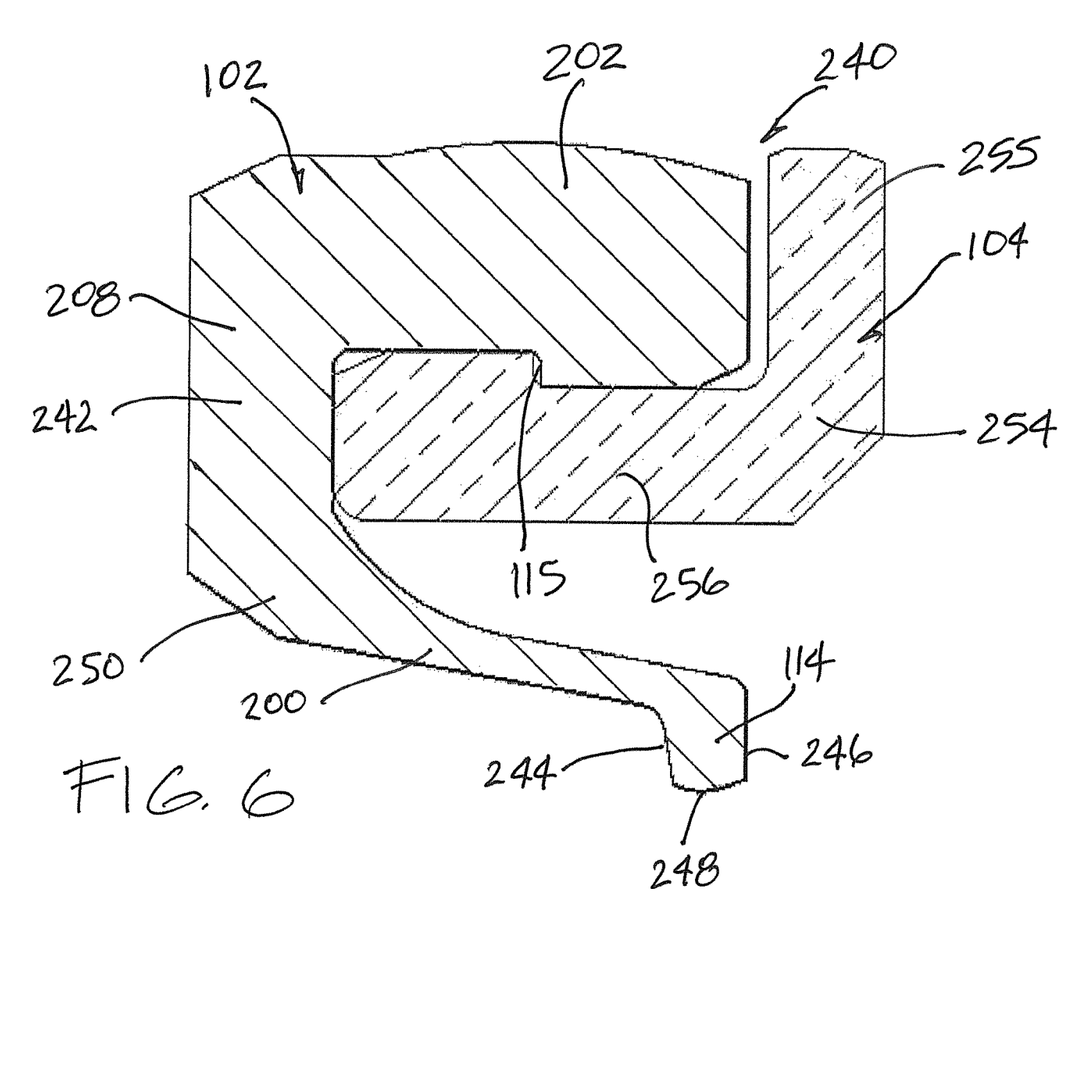
FIG. 6 shows an alternative seal assembly comprising a seal member having a seal lip with a generally constant width and a rigid member without a spring energizer.

FIG. 6 shows a partial cross-sectional view of yet another alternative seal assembly 240 provided in accordance with further aspects of the present disclosure. The present seal assembly 240 is understood to be annular in configuration and has a bore for receiving a dynamic member, similar to the seal assemblies of FIGS. 1-4. As shown, the seal component 102 has a seal body 208 comprising a center channel section 242, an outside flange 202 and an inside flange 200 comprising a seal lip 114 at an end thereof. The seal lip 114 projects away from the outside flange 202 for sealing against a dynamic member, such as a rod or a shaft. The seal lip 114 has a bottom wall 248 and two sidewalls 244, 246 having a width measured thereacross. In one example, the width is constant. In another example, the width varies in dimensions as it extends from the bottom wall 248 towards the outside flange 202. In an example, the variation does not exceed about 20% of the maximum width that wears. In other examples, the range can vary a greater amount, such as to about 25%.

The inside flange 200 is attached to the center channel section 242 and tapers outwardly away from the outside flange 202 as it extends from the base 250 of the center channel section towards the seal lip 114. The outward taper is provided to create a self-biasing force at the seal lip 114 against the dynamic surface and to do so without a spring energizer. Moreover, any of embodiments with a spring energizer disclosed herein may be modified to include a taper at the respective inside flanges so that the assemblies may be used without a spring energizer. For an embodiment with two seal lips, one can be energized by a spring energizer while the other can be self-biasing. As shown, the seal assembly 240 is usable with a dynamic member, such as a shaft or a rod, and the seal lip 114 seals against the moving surface of the dynamic member without a spring. As the seal lip wears, the friction between the seal lip and the moving surface remains relatively constant due to the generally constant width of the seal lip 114.

The rigid component 104 has a body 254 comprising a body flange 255 and an attachment flange 256 extending from the body flange. The rigid component 104 engages the seal component 102 with a snap joint 115 and more broadly in a latching engagement. Although not shown, a leaf spring may be incorporated with the rigid component 104, similar to the leaf spring 204 shown with reference to FIGS. 1-4.

Thus, an aspect of the present disclosure is understood to include a seal assembly comprising a sealing component 102 latched to a rigid component 104, which has a body 254 comprising a body flange 255 and an attachment flange 256 latched to an outside flange 202 of the sealing component. The sealing component further comprises a center channel section 242 having a base 250 and an inside flange 200 extending from the base 250. The inside flange comprising a projection or extended portion forming a seal lip 114, which has two sidewalls 244, 246 and a bottom wall 248. The sealing component 102 and the rigid component 104 each has a bore and together have a common bore for receiving a dynamic member, such as a shaft or a rod. The inside flange 200 tapers from the base 250 of the center channel section towards the common bore so that the bottom wall 248 of the seal lip 114 is closer to an axis defined by the common bore than if or when the inside flange 200 extends from the base 250 without any taper. The interior surface or side of the outside flange 202 and the exterior side or surface of the attachment flange 256 of the rigid component have projections that engage one another in a latching configuration. In an example, the extended portion for sealing against a dynamic member has a generally constant cross-sectional width to about 25% of a maximum width that wears during use to produce a generally constant surface friction when worn; and wherein the plurality of coils contact two tapered surfaces of the V-bottom. In the example shown, the inside flange 200 of the sealing component 102 tapers and biases towards the common bore without a separate biasing member, such as without a spring energizer.

FIG. 7 shows a partial cross-sectional view of yet another alternative seal assembly 270 provided in accordance with further aspects of the present disclosure. The present seal assembly 270 is understood to be annular in configuration and has a bore for receiving a dynamic member, similar to the seal assemblies of FIGS. 1-4. The present seal assembly 270 has a seal component 102 but is not used in combination with a rigid component, i.e., unlike the assemblies of FIGS. 1-4 and 6. In the present embodiment, the inside flange 200, the outside flange 202, and the center channel section 242 together or in combination define a spring cavity 134 having a spring energizer 112 located therein. Thus, the present spring cavity 134 is similar to the spring cavity of one-half of the seal assemblies of FIGS. 2-4, the side without the rigid component 104. As shown, the outside flange 202 has a thickness that is about 5.5 times to about 15 times the thickness of the inside flange 200. This thickness differential allows the V-groove 136 to be formed on the interior surface 274 of the outside flange 202. As shown, the V-groove 136 has two tapered surfaces 136a, 136b and a flat bottom surface 136c located therebetween. In other examples, the two tapered surfaces 136a, 136b contact or extend from one another to form an apex.

The coils 276 (only one shown) of the spring energizer 112 contact the two tapered surfaces 136a, 136b when located inside the spring cavity 134. Depending on the steepness of the two tapered surfaces 136a, 136b of the V-groove and the geometry of the coils, such as their major and minor axes, the coils may or may not also touch the flat bottom surface 136c. The spring cavity 134 has a single groove sidewall 278, which is shown spaced from the coils 276. In some examples, the coils 276 contact the groove sidewall 278.

Axial placement of the minor axes 280 of the coils 276 relative to the seal lip 114 may be controlled by shaping the tapered surfaces 136a, 136b so that they hold the coils 276 against the inside surface 282 of the inside flange 200. The two contact areas 284 between the V-groove 136 and the coils 276 set the coils' axial position relative to the lengthwise axis of the seal assembly bore. In the figure shown, the coils are shown spaced from the sidewall 278.

In an example, the seal lip 114 has an inside sidewall 290 that is located at approximately in-line, such as being along an axial position of the lengthwise axis of the seal assembly bore, with the first apex 292 of the V-groove 136 and spaced from the second apex 294. This sets the position of the minor axes 280 of the spring coils 276 to be just off of the width of the seal lip 114 by an appropriate amount, i.e., acceptable range, to sufficiently bias the seal lip 114 against the moving surface of a dynamic member, such as a shaft or a rod. In another example, the inside sidewall 290 of the seal lip is located well to the right of the first apex 292 so as to move the axial position of the minor axis 280 relative to the width of the seal lip.

Although limited embodiments of valve assemblies and their components have been specifically described and illustrated herein, many modifications and variations will be apparent to those skilled in the art. For example, the various seal members and rigid members may be made from different materials than as described, have different sizes, can attached to one another in other than a snap-joint, etc., provided they have at least one seal lip in which the width is generally constant so that when it wears, the friction between the seal lip and the dynamic surface that it seals against is generally constant or within a small variation, such as around 2% to about 25%, and more particularly from about 5% to about 15%. Furthermore, it is understood and contemplated that features specifically discussed for one valve embodiment may be adopted for inclusion with another valve embodiment, provided the functions are compatible. For example, where certain seal embodiment is described with a flat bottom groove located between two sidewalls and not another, it nonetheless may be used in other embodiment shown but not expressly described. Accordingly, it is to be understood that the seal assemblies and their components constructed according to principles of the disclosed devices, systems, and methods may be embodied other than as specifically described herein. The disclosure is also defined in the following claims.

What is claimed is:

1. A seal assembly comprising:
    a sealing component and a spring energizer comprising a plurality of coils, the sealing component and the spring energizer each comprising a bore that align;
    the sealing component comprising an inside flange with a seal lip and a groove having a V-bottom in which the spring energizer is located;
    the seal lip comprising an extended portion that extends in a direction of the bore; the extended portion for sealing against a dynamic member has a generally constant cross-sectional width to within 23% of a maximum width that wears during use to produce a generally constant surface friction when worn; and
    wherein the plurality of coils contact two tapered surfaces of the V-bottom.

2. The seal assembly according to claim 1, wherein the seal lip has two sidewalls that are generally parallel.

3. The seal assembly according to claim 1, further comprising a rigid component connected to the sealing component.

4. The seal assembly according to claim 3, wherein the rigid component has the V-bottom formed therewith for retaining the spring energizer.

5. The seal assembly according to claim 3, wherein the sealing component and the rigid component are engaged by snap fit.

6. The seal assembly according to claim 3, wherein the sealing component and the rigid component are engaged by latching.

7. The seal assembly according to claim 3, wherein the sealing component and the rigid component are in butting contact.

8. The seal assembly according to claim 1, wherein the sealing component comprises a second seal lip formed on a second inside flange and wherein the inside flange and the second inside flange have end edges that point away from one another.

9. The seal assembly of claim 8, wherein a second spring energizer biases the second seal lip and wherein the second seal has a constant cross-sectional width to within 20% of a maximum width that wears during use to produce a generally constant surface friction when worn.

10. The seal assembly of claim 9, wherein the second spring energizer is located in a second groove cavity comprising a v-bottom.

11. A method for manufacturing a seal assembly comprising:
    placing a spring energizer comprising a plurality of coils into abutting contact with the sealing component so that a bore of the spring energizer and a bore of the sealing component align;
    the sealing component comprising an inside flange with a seal lip and a groove having a V-bottom in which the spring energizer is located;
    the seal lip comprising an extended portion that extends in a direction of the bore; the extended portion for sealing against a dynamic member has a generally constant cross-sectional width to within 23% of a maximum width that wears during use to produce a generally constant surface friction when worn; and
    wherein the plurality of coils contact two tapered surfaces of the V-bottom.

12. The method according to claim 11, wherein the seal lip has two sidewalls that are generally parallel.

13. The method according to claim 11, further comprising attaching a rigid component to the sealing component.

14. The method according to claim 13, wherein the rigid component has the V-bottom formed therewith for retaining the spring energizer.

15. The method according to claim 13, wherein the sealing component and the rigid component are engaged by snap fit.

16. The method according to claim 13, wherein the rigid component has a leaf spring and wherein the leaf spring is biased against an interior surface of a housing.

17. The method according to claim 13, wherein the sealing component and the rigid component are in butting contact.

18. A method for using a seal assembly comprising:
    placing a sealing component and a spring energizer comprising a plurality of coils into a bore of a housing; the sealing component and the spring energizer each comprising a bore that align for receiving a shaft;
    the sealing component comprising an inside flange with a seal lip and a groove having a V-bottom in which the spring energizer is located;
    the seal lip comprising an extended portion that extends in a direction of the bore; the extended portion for sealing against a dynamic member has a generally constant cross-sectional width to within 20% of a maximum width that wears during use to produce a generally constant surface friction when worn; and wherein the plurality of coils contact two tapered surfaces of the V-bottom.

19. The method according to claim 18, wherein a rigid component is attached to the sealing component.

20. The method according to claim 19, wherein the rigid component has the V-bottom formed therewith for retaining the spring energizer.

21. The method according to claim 19, wherein the sealing component and the rigid component are engaged by snap fit.

22. The method according to claim 19, wherein the rigid component has a leaf spring and wherein the leaf spring is biased against an interior surface of the housing.

23. The method according to claim 19, wherein the sealing component and the rigid component are in butting contact.

24. A seal assembly comprising:
- a sealing component comprising a bore, an outside flange, a center channel section comprising a base, and an inside flange;
- a rigid component comprising a bore, a body comprising a body flange and an attachment flange;
- the sealing component and the rigid component latched to one another by engaging projections on the outside flange of the sealing component and the attachment flange of the rigid component together;
- the inside flange of the sealing component comprising an extended portion forming a seal lip for sealing against a dynamic member; the seal lip comprising two sidewalls and a bottom wall; the inside flange tapers without aid of a spring energizer from the base of the center channel section towards a common bore defined by the bore of the sealing component and the bore of the rigid component so that the bottom wall of the seal lip is closer to an axis defined by the common bore than when the inside flange extends from the base without any taper; and
- wherein the extended portion has a generally constant cross-sectional width to about 23% of a maximum width that wears during use to produce a generally constant surface friction when worn.

* * * * *